Figure 1:

No. 787,854. PATENTED APR. 18, 1905.
A. J. MUNDY & J. B. MILLET.
METHOD OF FINDING THE DIRECTION OF SOUND.
APPLICATION FILED AUG. 20, 1904.

WITNESSES:
M. V. Foley.
J. N. Dolan.

INVENTORS:

No. 787,854.

Patented April 18, 1905.

UNITED STATES PATENT OFFICE.

ARTHUR J. MUNDY AND JOSIAH B. MILLET, OF BOSTON, MASSACHUSETTS.

METHOD OF FINDING THE DIRECTION OF SOUND.

SPECIFICATION forming part of Letters Patent No. 787,854, dated April 18, 1905.

Application filed August 20, 1904. Serial No. 221,481.

*To all whom it may concern:*

Be it known that we, ARTHUR J. MUNDY and JOSIAH B. MILLET, citizens of the United States, and residents of Boston, in the county of Suffolk and State of Massachusetts, have invented a new and useful Improvement in Methods of Finding the Direction of Sound, of which the following is a full, clear, and exact description, reference being had to the accompanying drawings, forming a part of this specification, in explaining its nature.

The invention relates to submarine signaling—that is, to the making and receiving of sound-signals in water; and it consists in a method of ascertaining on a moving vessel by means of sound-waves traversing the water the direction which the source of such sound-waves bears to the moving vessel. The sound-signals may be communicated to the water at any submerged point. The signals may be of any character, and the sound-waves communicated to the water radiate from the signaling apparatus and are of a length dependent upon the pitch of the fundamental note of the signaling apparatus. Various means have been devised for receiving on a vessel at a distance from the submerged signaling apparatus the vibrations of said sound-waves.

The present invention relates to the method of using said sound-receiving devices or any sound-receiving devices upon a vessel while it is in motion and so that the direction of the signaling apparatus from the vessel may be readily ascertained. This is accomplished by employing two sound-receiving instruments, one at either side of the vessel near the stern or a similar pair near the bow, or both. When a pair of receivers are thus located near the stern, a slight swing of the vessel to port or starboard will quickly interpose a maximum of bulk between a signal which the vessel is approaching and one receiver and quickly expose the other receiver. If the signal be astern, then a swing of the vessel to port or starboard will slowly interpose a minimum of bulk between one receiver and the signal and slowly expose the other receiver. In other words, the portion of the vessel forward of the sound-receiving instruments when the signal is ahead or the portion of the vessel aft of the sound-receiving instruments when the signal is astern is by swinging the vessel to port or starboard caused to be so interposed between one or the other of the sound-receiving instruments and the source of sound as to affect the degree or force of the vibrations or sound-signals which it receives and transmits. By comparing the force or values of the sound vibrations or signals received in any given position of the vessel by both receiving instruments, one on either side of the vessel, the direction of the signaling-station is readily determined and the general course of the vessel laid with relation thereto. When the receivers are arranged on the bow, a swing of the vessel exposes one receiver slowly to a signal ahead and slowly screens the other receiver therefrom by the interposition of the bulk of the vessel. If the signal is astern, one receiver is quickly screened from the signal by the turning of the vessel, while the other receiver is as quickly exposed thereto. For the best results two receiving instruments should be placed on opposite sides of the vessel at least a little more than one wave length of the dominant note of the sound-signal from one end of the vessel and about one wave length of said note from the keel, the location depending somewhat upon the construction of the vessel itself and the location of its machinery.

We will now describe the invention in conjunction with the drawings forming a part of this specification, wherein—

Figure 2:

Figure 1 represents in diagrammatic form three positions of the vessel. Fig. 2 represents three positions of a vessel equipped with receiving instruments at the bow.

Any means for producing the submerged signals in the water may be used, and any instrumentality upon the vessel for receiving the signals from the water may be employed, and we therefore have not thought it necessary to indicate any special apparatus for accomplishing this purpose, but have referred generally to patented apparatus that can be employed, although we would not be understood as confining ourselves to it.

It will be understood, of course, that it is desirable that each receiving instrument should be so connected with an observation-point on the vessel that the sounds from each shall be received simultaneously or successively by the observer.

The diagram of Fig. 1 shows how the vessel is swung to obtain the difference in values of the sound-signals received by the two instruments from one side or the other and whereby the difference in their respective values between such points enables the direction of the point from which it emanates to be in the first place ascertained and in the second place to be followed, and this is true likewise of Fig. 2.

Having thus fully described our invention, we claim and desire to secure by Letters Patent of the United States—

1. The method of ascertaining the direction of a point from which submerged, sound-signals emanate, comprising the employing upon a moving vessel of two sound-receiving instruments placed upon the side of a vessel near one end or the other thereof, but at a distance therefrom of at least the wave length of the dominant note of the sound to be received, and causing said moving vessel to be turned in one direction or the other whereby the respective values of the two instruments in several positions of the vessel may be compared with each other and the direction of the source of said sound-waves from the vessel be ascertained.

2. A method of ascertaining the direction of a point from which submerged sound-signaling waves emanate, comprising the employment of one or more sound-receiving instrumentalities upon the side of a moving vessel near its end, but a distance therefrom of at least the wave length of the dominant note of the sound to be received, and the turning of said vessel with respect to the signaling-waves to vary the effect, value or force of the vibrations of such waves upon the receiving instrument, as and for the purposes set forth.

3. A method of ascertaining the direction of a point from which submerged sound-signaling waves emanate, comprising the employment of one or more sound-receiving instrumentalities upon the side of a moving vessel near its end, but a distance therefrom and from the keel of the vessel of at least the wave length of the dominant note of the sound to be received, and the turning of said vessel with respect to the signaling-waves to vary the effect, value or force of the vibrations of such waves upon the receiving instrument, as and for the purposes set forth.

4. The method of ascertaining the direction of a point from which submerged sound-signaling waves emanate, comprising the employment of two sound-receiving instrumentalities upon the side of a moving vessel near its end, but a distance therefrom of at least the wave length of the dominant note of the sound to be received, and the turning of the vessel in various positions with respect to the signaling-waves to vary the effect, value or force of the vibrations of such waves upon the receiving instrumentalities until the said effect is equal upon both instrumentalities and the direction thereof determined, as described.

ARTHUR J. MUNDY.
JOSIAH B. MILLET.

Witnesses to A. J. M.:
  GEORGE O. G. COALE,
  M. E. FLAHERTY.
Witnesses to J. B. M.:
  HORACE B. GALE,
  ANNIE J. CONVERSE.